April 13, 1937.  H. H. PLATT  2,076,791
AUTOMATIC GEAR SHIFT FOR AUTOMOBILES
Filed May 22, 1933   5 Sheets-Sheet 3

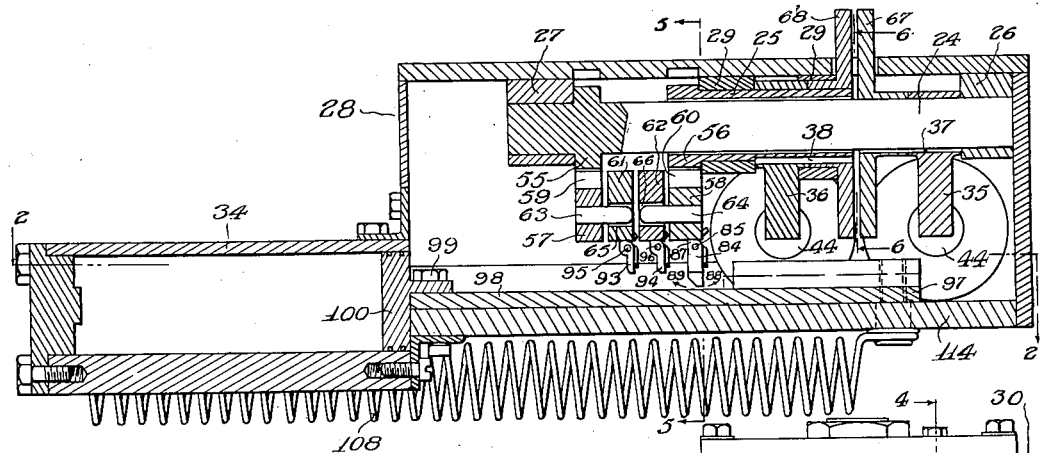

Inventor
HAVILAND H. PLATT.
By Leonard L. Kalish
Attorney

April 13, 1937.  H. H. PLATT  2,076,791
AUTOMATIC GEAR SHIFT FOR AUTOMOBILES
Filed May 22, 1933    5 Sheets-Sheet 5

Inventor
HAVILAND H. PLATT.
By Leonard L. Kalish
Attorney

Patented Apr. 13, 1937

2,076,791

UNITED STATES PATENT OFFICE 2,076,791

AUTOMATIC GEAR SHIFT FOR AUTOMOBILES

Haviland H. Platt, New York, N. Y., assignor to Wilkening Manufacturing Company, Philadelphia, Pa., a corporation of Delaware Application May 22, 1933, Serial No. 672,367

17 Claims. (Cl. 74—336.5)

My invention relates to a new and useful improvement in power transmission for automobiles and other vehicles, and it relates more particularly to automatic means for varying the mechanical ratio between the shaft of the prime mover, such as the internal combustion engine, and the rear or driving axle of the vehicle, as required by the various conditions of operation.

My invention relates more particularly to an automatic gear-shifting device, which may either include speed change gears, or which may be made auxiliary to speed change devices now in use on automobiles.

Thus, it is an object of my invention to provide means whereby the various changes in mechanical ratio between the engine shaft and the driven wheels of an automobile, (as for instance, the "gear shifting" of an automobile) may be made automatic and yet responsive to the requirements of each of the many conditions of operation encountered at any time.

With the above and other objects in view, which will appear more fully from the following detailed description, my invention consists of means which may be associated with any of the forms of standard or conventional speed change devices now generally in use in automobiles, to render said speed change device automatic and responsive to the condition of the engine and the relative speed between engine and drive shaft.

My invention further consists of a combination of speed change means, and control means therefor;—the latter being in turn responsive to engine conditions and relative speed conditions of engine shaft and automobile drive shaft.

My invention further consists of power actuated means for shifting the gears into mesh in any one of several positions, and power actuated means for shifting the gears into "neutral" from any position, that is, disengaging any one of the several different gears of a system of "speed-change" gears. In the present embodiment of my invention, these power actuating means are pneumatic means, which derive their power from compressed air supplied from any suitable air compressor, and a suitable reservoir, in which a generally constant supply of air at generally constant pressure is maintained by any suitable governor or pressure relief device, or both;—the compressor being preferably driven from the engine of the automobile.

My invention further consists of selector mechanism, controlling each of said power actuating means and being in turn controlled by, or responsive to the rotational speed of the shaft of the engine; the rotational speed of the drive shaft (or driven wheels), the vacuum condition in the intake or inlet manifold of the engine, and the position of the speed-change gears themselves.

The present invention further consists of a series of interrelated valves within said selector mechanism and centrifugal means for positioning two of said valves, pneumatic means for positioning another of said valves, and mechanical means connected with the gear shift bars for moving the other two of said valves;—all interrelated by passages and movable and stationary ports, to effect the desired positioning of gears for any condition of operation which may be encountered.

The present invention further consists of other novel features and principles of construction which will appear more fully from the following detailed description.

For the purpose of illustrating my invention, I have shown in the accompanying drawings, one form thereof which is at present preferred by me, since the same has been found in practice to give satisfactory and reliable results, although it is to be understood that the various instrumentalities of which my invention consists can be variously arranged and organized and that my invention is not limited to the precise arrangement and organization of the instrumentalities as herein shown and described.

Referring to the drawings in which like reference characters indicate like parts:

Figure 1 represents a generally diagrammatic view showing the relationship between the several component parts of my present invention, that is, the relationship between the powered gear actuating means, that is, the air cylinders, the gear shifting slides, the neutral mechanism, the selector mechanism or selector "box", the air compressor, and the manually operated control valves which are preferably placed on the dash-board or some other convenient point, for setting the automatic gear shift for operating the car in reverse and for also totally disconnecting the automatic gear shift when manual operation of the gear shift is desired for any reason.

Figure 2 represents a plan view of the air powered gear shift actuating mechanism, with the central portion thereof partly broken away and sectioned, generally on line 2—2 of Figure 3, thereby to expose to view the neutral cylinder and the neutral slide. In this Figure 2, the two concentric transmission shafts are omitted.

Figure 3 represents a section on line 3—3 of Figure 2, illustrating the transmission shafts and the shifting slides, and the racks and pinions through which the power is transmitted to the same.

Figure 10 represents a schematic sectional view on line 10—10 of Figure 1, on a much enlarged scale.

In carrying out my invention, any suitable or conventional type of speed-change device or "gear box" may be employed, generally having three "forward" positions and having one reverse position.

For purposes of illustration, a standard "three-speed" gear box is assumed and represented generally by the letter "G", in which the gears have the standard gear shift positions for all three forward speeds as well as for reverse. In the diagrammatic view of Figure 1, the engine is represented generally by the letter "E", and the clutch housing by the letter "C".

Figure 1:
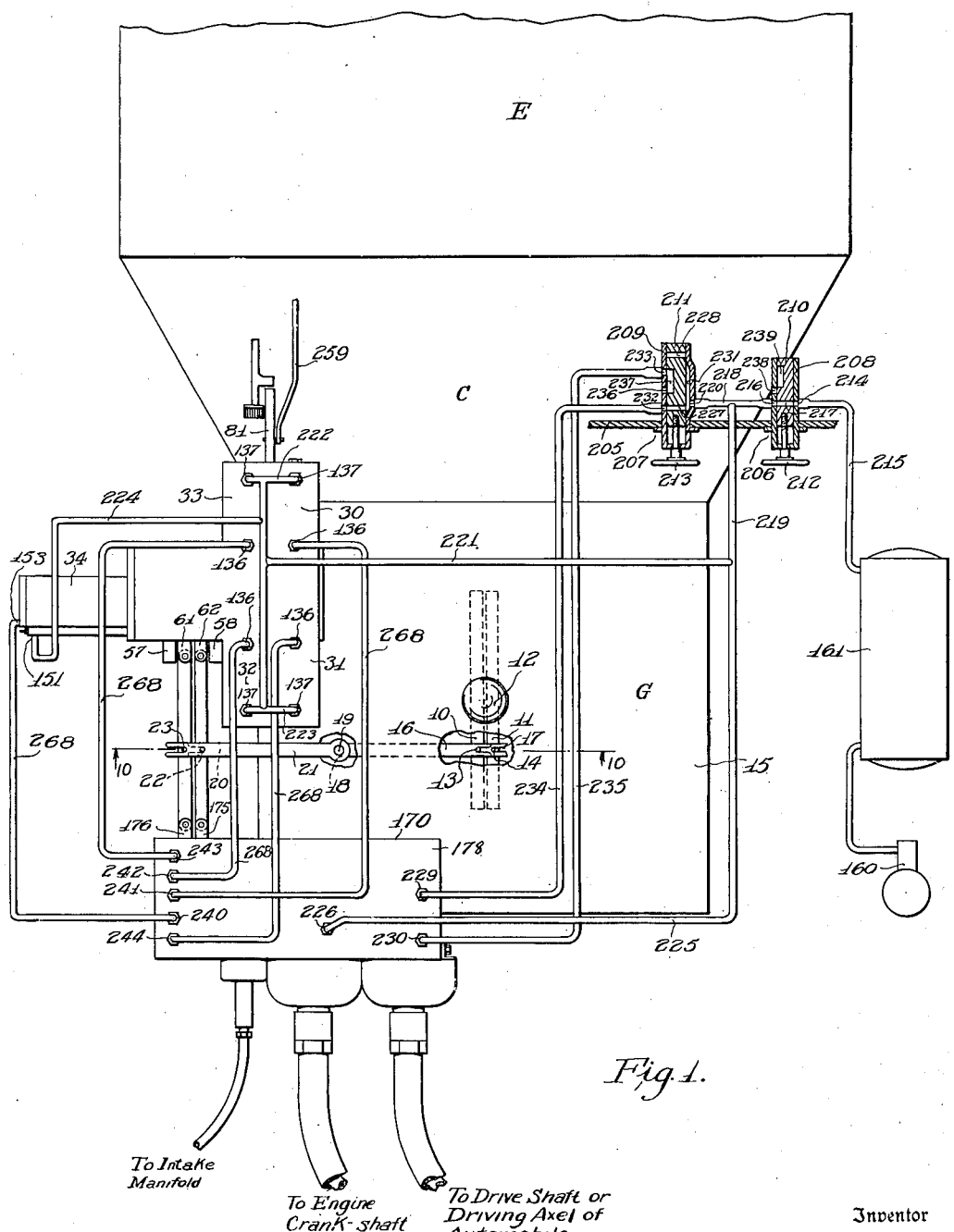

The "2nd" and "high" slide 10, and the "1st" and "reverse" slide 11, both represented generally diagrammatically in Figure 1, are of any conventional standard construction and adapted to be engaged alternately and selectively by the lower end of the manual gear shift rod designated generally by a circle identified by the numeral 12 in Figure 1. The conventional gear shift slides 10 and 11 are provided with pins 13 and 14, respectively.

Within the upper cover plate 15 of the gear box housing "G", a pair of levers 16 and 17 are provided, preferably superimposed upon each other, and carried by a pair of concentric pivots 18 and 19, respectively, which extend through the cover plate and are journalled in the cover plate. The free ends of the levers 16 and 17, are slotted or bifurcated longitudinally and engage the pins 13 and 14 respectively, so that a deflection of the lever shifts the slides 10 and 11, respectively. To the outer ends of the concentric pivots 18 and 19, a pair of similar levers 20 and 21 are secured. The free ends of the levers 20 and 21 are in turn pivotally connected, by means of pivots 22 and 23, to the shift operating cross-slides in the air-powered gear actuating mechanism shown in detail in Figures 2, 3, 4, 5 and 7, and to the gear-position valves in the selector mechanism shown in detail in Figures 8 and 9.

The gear shifting mechanism includes two (or more, depending on the number of shift slides in the gear box and the number of gear positions) concentric transmission shafts 24 and 25 respectively, the inner shaft being suitably journalled in any suitable bearing members 26 and 27, and the outer tubular shaft 25 being journalled in the bearings 29;—said bearings 26, 27 and 29 being carried by the housing 28. The gear shifting mechanism further includes two (or more) opposed pairs of air-cylinders (and corresponding pistons therein) on opposite sides of the transmission shafts;—said air cylinders being designated generally by the numerals 30, 31, 32 and 33, and being, respectively, the "1st gear" cylinder; the "reverse-gear" cylinder; the "2nd-gear" cylinder; and "high-gear" cylinder.

Figure 7:
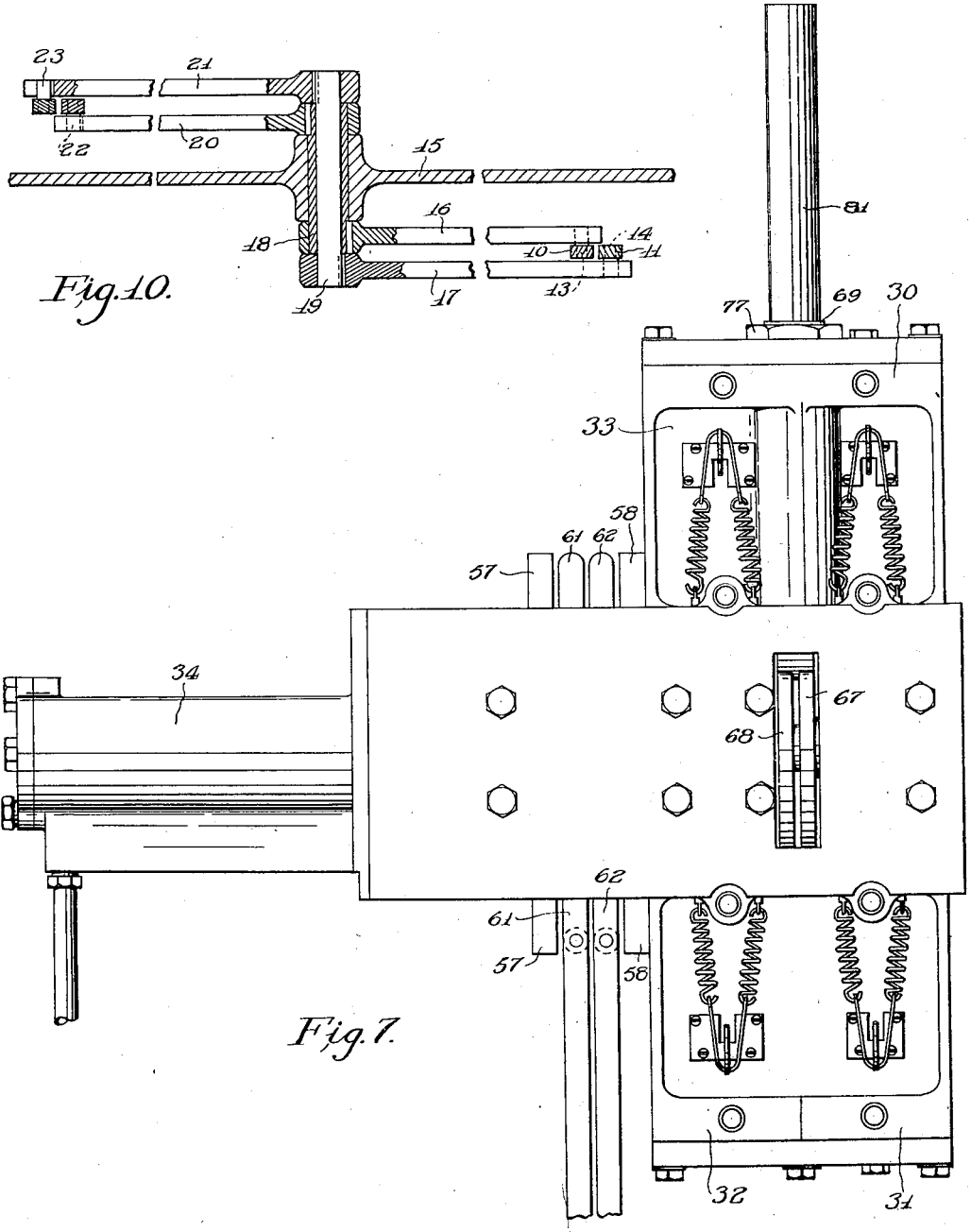
Figure 7 represents a top plan view of the air-powered gear actuating unit.

At one end of the actuating mechanism is the "neutral" cylinder 34, generally at a right angle to the cylinders 30, 31, 32 and 33, as seen particularly in Figures 2, 3 and 7.

To each of the transmission shafts 24 and 25, generally similar crank levers 35 and 36 are secured, by suitable keys 37 and 38, respectively. The crank levers 35 and 36 may have generally arcuate terminal surfaces 39 or any other surface of no greater radial dimension. Each of the crank levers has a pair of opposed and generally rounded contact projections or knobs 40 and 41, respectively;—said contact projections or knobs being in suitable spaced relation to each other, and to the ends of the opposed piston rods 44 of the actuating pistons 42.

Each of the cylinders 30, 31, 32 and 33, has disposed within it a piston 42, of any suitable construction, and having any suitable packing means, such as the piston rings 43 or the like, for establishing a sliding seal between the piston and the cylinder-wall against the air pressure. Each piston 42 carries a piston rod or plunger 44, which extends through a suitable opening 45 in the inner cylinder closure member or cap member 46 and which is slidably mounted therein. A helical compression spring 47 is interposed between each piston 42 and inner cylinder head or cap or closure member 46 for returning the piston 42 and piston rod or plunger 44 to its outermost or initial position when the air is relieved;—the piston and plunger moving through its operative stroke in the direction of the arrow 48, under the action of compressed air which is admitted into the space 49 between the piston 42 and outer cylinder head 51 through the port 50 by the slide valve 52.

The maximum radial dimension of each of the crank levers 35 and 36, and the distance between the two contact points 40 and 41 of said levers is so proportioned with respect to each other, that while the contact projections 40 and 41 are in operative alignment with the ends of the plungers 44, when the levers are in their central or "neutral" position (shown particularly in Figure 4), the crank-lever clears the ends of the plungers 44 on either side when deflected by the action of the plunger from the other side. Thus, there is a suitable amount of radial clearance 53 between the radially outermost parts of the crank levers 35 and 36 and the ends of the corresponding pair of opposed plungers 44 when the respective plungers 44 and pistons 42 are in their retracted positions shown in Figure 4. By reason of this clearance, and the relative radial dimension of the levers 35 and 36, and the relative distance between the respective contact points 40 and 41, said levers 35 and 36 may be deflected in either direction, by the action of the corresponding plunger upon it, without interfering with the opposite plunger which is then inoperative;—the levers 35 and 36 "clearing" the end of the retracted or inoperative plunger 44.

The opposite ends of the transmission shafts or pivots 24 and 25 carry fragmentary pinions or toothed segments 55 and 56, respectively, which may be either formed integrally with said shafts or pivots, or which may be secured thereto. Beneath and in operative alignment with the pinions 55 and 56, and extending transversely of and generally at a right angle to the axis of the pivots or transmission shafts 24 and 25, toothed rack members 57 and 58 are provided, each slidably mounted within the housing 28. The toothed rack members 57 and 58 are provided with teeth 59 and 60 respectively, which are in mesh with the toothed segments or fragmentary pinions 55 and 56, respectively, thereby transmitting the motions of the shafts or pivots 24 and 25 to the rack members 57 and 58; thereby also translating the arcuate or rotary motions of the former into corresponding rectilinear motions of the latter.

Generally adjacent to each of the toothed rack members 57 and 58, secondary slides 61 and 62 are provided, extending generally parallel to the rack slide members 57 and 58, and being so slidably mounted in the housing 28.

The secondary slides 61 and 62 borrow rectilinear motion from the toothed rack slide members 57 and 58, respectively, by means of pins or projections 63 and 64, rigidly carried by the toothed rack slide members 57 and 58, respectively, which extend into and fit loosely within corresponding elongated slots 65 and 66 in the secondary slides 61 and 62, respectively. The slots 65 and 66 are somewhat shorter than the length of travel of the toothed rack slides 57 and 58, and said slots 65 and 66 are positioned centrally with respect to the pins 63 and 64, when the pins 63 and 64 and the slides 61 and 62 are in their neutral positions. By this means, the toothed rack slides 57 and 58, and the pins 63 and 64 carried thereby, may return to their central or neutral positions, after each displacement (in either direction) without drawing back with them the secondary slides 61 and 62, since the length of the slots 65 and 66 are sufficient to clear the pins 63 and 64, respectively, upon the return of the rack slides 57 and 58 to the "neutral" positions. Hence, the transmission shaft 24 or 25 (as the case may be) with its corresponding rocker lever 35 or 36, respectively, and the corresponding toothed segment or fragmentary pinion 55 or 56 (as the case may be) may return to their central or neutral position as soon as the air pressure in the particular actuating cylinder is released by the selector valves;—the shafts 24 and 25 being brought to their neutral position by the action of the clutch spring of the automobile upon the similar cams 67 and 68 carried by said shafts and acted upon by a follower connected to the clutch pedal of the automobile (as will be described more in detail hereinafter).

Figure 6:
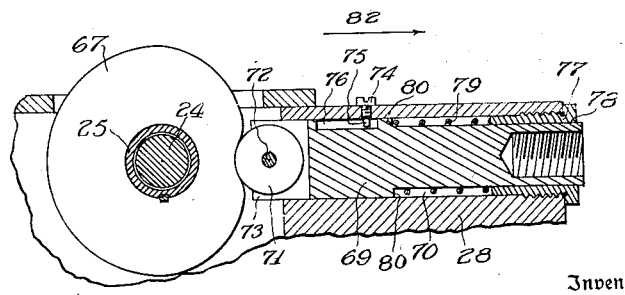
Figure 6 represents a section on line 6—6 of Figure 3, showing the clutch actuating cams, and clutch actuating plunger which follows said cams for declutching the engine in predetermined timed relation to the shifting of the gears.

The general contour of the cams 67 and 68, carried by the transmission shafts 24 and 25, respectively, is shown particularly in the fragmentary sectional view in Figure 6. Each of the cams 67 and 68 (shown in the neutral position in Figure 6) is generally symmetrical with respect to a plane passing through the axis of the shafts 24 and 25 and passing through the axis or line of travel of the follower plunger 69. The follower plunger 69 is slidably mounted in a suitable opening 70 in the housing 28, and carries at its inner end a follower roll 71 rotatably mounted upon the pivot pin 72 in the slot 73 in the end of the plunger 69. Any suitable means, such as the screw 74, having suitable bare inner end 75 running in a longitudinal slot 76, may be provided for preventing any rotation of the plunger 69. A tubular plug 77 is screw-threaded into the cylindrical bore 70, and the outer end of the plunger 69 is slidably mounted within the bore 78 of said plug 77. A helical compression spring 79 is interposed between the inner end of the stationary plug 77 and the annular shoulder 80 of the plunger 69. The spring 79 constantly urges the plunger 69 and the follower roller 71 towards the cams 67 and 68. Any suitable connecting means or connecting rod 81 may be provided intermediate the plunger 69 and the clutch lever of the automobile so that an outward movement of the plunger 69 in the direction of the arrow 82, caused by the rotational movement of either one of the two cams 67 and 68, in either of their two rotational directions, will cause the clutch to be disengaged, or the engine to be "de-clutched" from the "gear-box" of the automobile.

The plunger 69 is also connected, through any suitable connecting means such as the rod 81, to the gas throttle of the engine with any suitable over-running motion or connection, and in such a direction that the outward movement of the plunger 69 in the direction of the arrow 82 will close the throttle to "idling" position, regardless of the position of the "gas-pedal" or the "gas-lever" under the operator's control. The cams 67 and 68 are preferably so shaped, that by the first slight angular or rotational movement of the shaft 24 or the shaft 25, the plunger 69 will be moved outwardly to a substantial extent, and so that during the balance of the angular rotational movement of the shaft 24 or the shaft 25, the outward movement of the plunger 69 will be less in proportion to the angular movement. This is indicated by the contour of the cams shown in Figure 6. During the initial outward movement of the plunger 69, in the direction of the arrow 82, the gas throttle is closed down to "idling", while the de-clutching movement of the clutch lever is in its initial stage. The final or complete de-clutching movement of the clutch lever is then brought about by the continued movement of the plunger 69 over the more gradual rise in the cam 67 or 68.

The spring 79, augmented by the pressure of the clutch spring, serves to exert a rotational force upon the cams 67 and 68 which tends to return said cams, and hence, tends to return the shafts 24 and 25 to their neutral position, as the air pressure is released from the particular actuating cylinder 30, 31, 32 or 33, which caused the rotational movement of the particular shaft 24 or 25, and the corresponding cam 67 or 68 (as the case may be).

To the lower longitudinal edge of the toothed rack slide 58, a latch type cam follower 84 is pivotally secured on the pivot 85, which in turn, is carried by the pivot supporting members or lugs 86 which extend downwardly from the slide 58 and may be formed integrally therewith.

The pivoted end of the latch 84 is rounded on one side and is provided with a square heel 87 on the opposite side, so that the latch may be deflected in the direction of the arrow 88, from its normal position shown in Figure 3, and so that it will be fixed against deflection in the direction of the arrow 89, from its normal position shown in Figure 3. Any suitable spring, such as the double-ended helical torsion spring 90, pivoted on the outer projecting ends of the pivot 85, may be provided for constantly urging the latch 84 into its normal position shown in Figure 3. The free ends 91 of the spring 90 bear against the surface of the slide, while the intermediate portion 92 of the spring bears against the latch 84.

Each of the secondary slides 61 and 62 is provided with similar latch-type cam followers 93 and 94, respectively, mounted upon pivots 95 and 96, respectively. The latches 93 and 94 are similar in shape, but are different in dimensions from the latch 84. Thus, the latch 84 has greater radial length or depth, while the latches 93 and 94 have greater width. The latches 93 and 94 are similarly constructed, and are deflected in the direction of the arrow 88, and are anchored against deflection in the direction of the arrow 89. They are similarly urged into their normal position shown in Figure 3, by similar double-ended helical torsion springs, or any other suitable means.

Within the housing 28, a sliding cam or slipper cam 97 is slidably mounted, in a direction generally parallel to the axis of the shafts 24 and 25. The sliding cam or slipper cam 97 is connected, through a suitable flat connecting rod 98, and the bolts 99, to a piston 100 mounted within the "neutral" cylinder 34.

The sliding cam or slipper cam 97 is provided with an inclined camming surface 102 at a lower level and a pair of similar inclined camming surfaces 103 and 104 at an upper level, symmetrical with respect to the longitudinal median line or axis 105.

The camming surface 102 which terminates in the dwell 106, is adapted to engage only the latch 84, while clearing the two shorter latches 93 and 94. The camming surfaces 103 and 104 are adapted to engage, alternately, either one or the other of the latches 93 or 94;—whichever one of the two happens to be out of its "neutral" position.

The slipper cam 97 with its several camming surfaces, is moved through its operative stroke in the direction of the arrow 107, by a pair of suitable springs, such as the pair of helical tension springs 108 and 109, the movable ends of which are fastened to corresponding pins 110 and 111, which extend freely through slots 112 and 113 in the lower wall 114 of the housing 28, and which are fixedly fastened into or anchored in suitable holes in the slipper cam 97. The stationary ends of the springs 108 and 109 are fastened to any suitable stationary spring anchorages on the "neutral" cylinder.

The piston 100, and hence the slipper cam 97, are normally maintained in the position shown in Figure 2, by air pressure normally maintained within the "neutral" cylinder. Only while shifting any of the "gears" into "neutral", is the pressure in the "neutral" cylinder released, and the slipper cam 97 caused to travel through its operative stroke in the direction of the arrow 107 under the influence of the helical tension springs 108 and 109.

In travelling through its operative stroke, in the direction of the arrow 107, the slipper cam 97 first engages the latch 84 by means of the camming surface 102 and moves the latch 84 as well as the rack slide member 58 to one side of its "neutral" or central position (shown in Figure 2) against the force of the clutch spring of the automobile and the force of the spring 79 (Figure 6) acting on the cam 68;—until the latch 84 rides on the dwell 106. This deflection of the rack slide 58 causes a disengagement of the clutch of the automobile through the push rod or connecting rod or other connecting means 81 (Figure 6) and also causes the throttling down of the engine in timed relation to the de-clutching action. The action of the cam 102 upon the latch 84 is sufficiently in advance of the action of either cam 103 or 104 upon either latch 93 or 94 (depending on which of these two latches happens to be off its neutral or central position) so that the clutch of the automobile will have been disengaged before the particular "gear" is shifted into "neutral" by the action of either cam 103 or cam 104 upon either latch 93 or 94. Upon the completion of its full operative stroke in the direction of the arrow 107, the edge or end wall 116 of the slipper cam 97 contacts the end 117 of the slide valve 118 and forces it in the direction of the arrow 107, thereby again to admit air into the "neutral" cylinder (in a manner which will be described more in detail hereinafter) thereby automatically and instantly returning the slipper cam 97 into its normal position shown in Figure 2, after each operative stroke;—the operative stroke being merely for "clearing" the gears, that is, disengaging the particular gear which happens to be engaged and instantly throttling down the engine and declutching the engine, preliminary to such gear disengagement. During the return stroke of the slipper cam 97, under the influence of compressed air (acting against the springs 108 and 109), the latches 84, 93 and 94 are deflected about their respective pivots, so that the camming surfaces 102, 103 and 104 can have no effect upon said latch members nor upon the slides which carry said latch members, regardless of the position of said latches and slides. As explained hereinabove, the latches 84, 93 and 94 can be deflected in the direction of the arrow 88, but are firm in the direction of the arrow 89;—the deflection in the direction of the arrow 88 being against suitable spring tension created by the double helical torsion springs 92 or other suitable spring members or yieldable resistance means.

Each of the cylinders 30, 31, 32, 33 and 34, being respectively, the "1st"; "reverse"; "second"; "high"; and "neutral" cylinders, is controlled directly by corresponding slide valves 120, 121, 122, 123, and 118, respectively.

Each of the slide valves 120, 121, 122, 123 and 118, is of the snap type or trigger type, so that after the slide valve has been moved in either direction through part of its travel, it automatically moves through the balance of its travel in the same direction under the influence of a spring and with a more or less instantaneous action. Thus, with each of said slide valves, a pivotally mounted trip arm 124 is associated; mounted upon a suitable pivot 125 on a bracket 126, and having a rounded end 127 extending through a suitable slot 128 in the wall of the stationary housing of the slide valve, and extending into a suitable notch 129 in the slide valve. The trip member 124 contains a spring arm 130, at 90°, more or less, to the main arm thereof, which is engaged by a spring yoke 131, which in turn, is acted upon by the pair of helical tension springs 132 and 133, the opposed ends of which are anchored to suitable spring anchorages 134;—the tension or force of said springs being adjustable through the nuts or other suitable screw-threaded means 135 which hold the spring anchorages in place.

The stationary housing of each of the slide-valves 120, 121, 122 and 123, has a stationary inlet port 136 through which air may be admitted for actuating the slide valve in one direction, and a stationary inlet port 137, through which air may be admitted into the cylinder for actuating the gear-shifting piston 42.

The slide-valve members 120, 121, 122, and 123 are each slidably mounted within corresponding cylindrical openings in their respective stationary housings, and a pin or other suitable device 138 is carried by each of said slide-valves, with the opposed ends thereof projecting beyond the body of the slide-valve member and extending into corresponding slots 139 and 140 in the housing:— with the inner end 141 of the pin extending into the corresponding air cylinder, and into the path of the gear-shifting piston 42.

Figure 4:
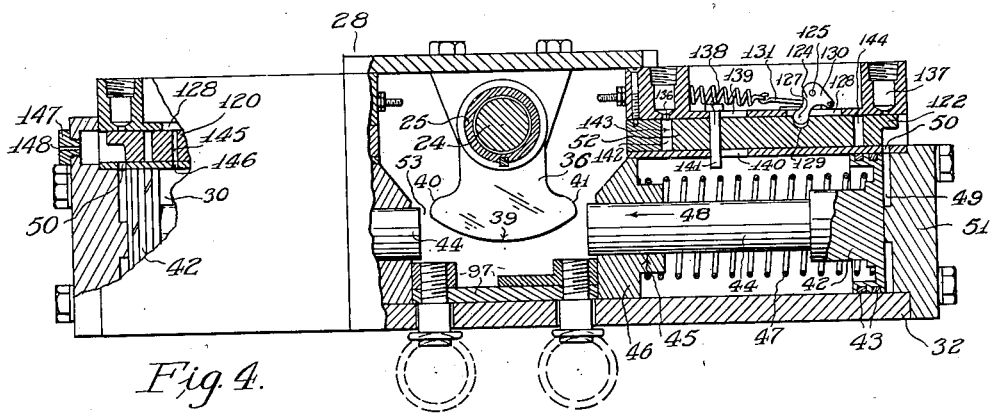
Figure 4 represents an end elevational view of the air powered gear shifting mechanism, partly sectioned on line 4—4 of Figure 2.
Figure 5:
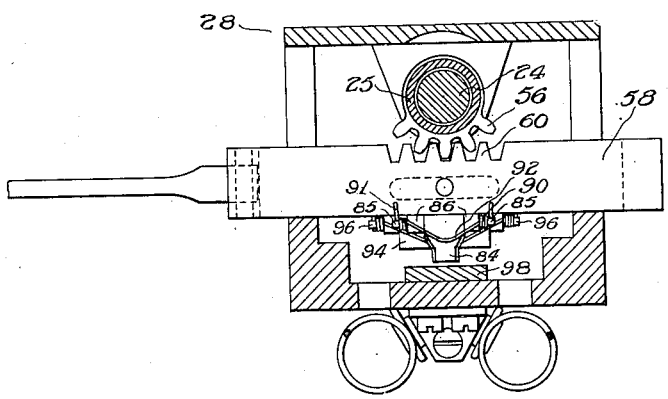
Figure 5 represents a section generally on line 5—5 of Figure 3, illustrating the relationship between the transmission shafts and the racks and pinions by which the motion is transmitted therefrom to the shifting slides.

In the normal inoperative condition, the gear-shifting pistons 42 are in the retracted position indicated in Figure 4, and the corresponding slide-valves are in the position also shown in Figure 4. In this position the inlet ports 137 are closed off by the slide-valve. The operation, controlled by the selector mechanism hereinafter described, is first to admit air through the port 136, into the space 142, between the end of the slide valve and the stationary closure plug 143, thereby causing the slide-valve to be displaced in the direction of the arrow 143. This displacement continues under the influence of the compressed air admitted through the stationary port 136, until the spring yoke passes the center 125 of the support of the trigger arm 124. Thereafter, the force of the compressed air admitted through the port 136 is augmented by the force of the springs 132 and 133. By reason of the force of the springs, the balance of the travel of the slide-valve in the direction of the arrow 143, is effected in an instantaneous manner, causing the movable port 144 of the slide-valve member to come into registration with the stationary port 137, and the stationary port 50, thereby establishing communication between the air reservoir and the space within the particular cylinder behind the gear-shift piston 42. Under the influence of the compressed air which is thus admitted through the port 137, the particular gear-shifting piston 42 is caused to travel the full length of its stroke against the force of the spring 47, thereby effecting a shifting of the particular "gear" in a manner hereinabove described. As the gear-shifting piston 42 travels the last portion of its operative stroke, it encounters the lower end 141 of the pin 138 of its slide-valve, and carries said pin and slide-valve with it until the spring yoke 131 passes the "dead-center" of the trigger arm 124 and until the latter thereby moves the slide-valve through the balance of its travel in the same direction. This returns the slide-valve into its initial position shown in Figure 4, in which position the stationary port 50 is opened to the atmosphere, thereby permitting the spring 47 to return the "gear-shifting" piston to its initial position shown in Figure 5, and permitting the clutch to be re-engaged and the gas throttle to be opened responsive to the position of the "gas pedal" of the automobile.

The slide-valves 120 and 121, corresponding to the "1st" and "reverse" cylinders, respectively, are each provided with an auxiliary relief port 145, and these cylinders are also provided with a stationary relief port 146, in advance of the port 50, in the same cylinder, through which ports 145 and 146 additional relief is given for the exhaust of the air through the slot 128. The outer ends of the cylindrical valve housings, housing the slide valves 120 and 121 of the "1st" and "reverse" slide-valve members 120 and 121, are closed off by slow-relief plugs 147, having relatively small relief apertures 148. By means of this slow-relief device, the return movement of the gear-shifting piston 42 in the "1st" and "reverse" cylinders, is checked or slowed down through the last portion of its return travel, so as to moderate the re-engagement of the clutch of the automobile and the opening of the gas throttle, thereby to obtain a "smoother" start, or a more gradual acceleration of the automobile in "1st" and in "reverse". Thus, through the first portion of the return movement of the gear-shifting piston (under the influence of the return spring 47), the air is exhausted rapidly through the ports 145 and 146 and the slot 128. This rapid exhaust causes the rapid return movement of the gear-shifting piston until the gear-shifting piston closes off the port 146, after which the return movement of the gear-shifting piston is checked and slowed down by the relatively smaller diameter of the exhaust opening 148 in the plug 147. The size of the opening 148 is predetermined according to the clutch action desired in "1st" and "reverse". If desired also, the opening 148 may be controlled by the longitudinal inclination of the automobile. Thus, if desired, the plug 147 in the opening 148 therein, may be augmented by a valve in connection with said opening 148, the position of which valve would be controlled by a pendulum-like weight which would be responsive to forward and rearward inclinations of the automobile, so that the re-engagement of the clutch will be slower or more gradual if the automobile must be started on an up incline, and whereby the re-engagement of the clutch will be more rapid if the automobile is to be started on a down incline (in either "1st" or "reverse").

The slide-valve 118 of the "neutral" cylinder is provided with but a single movable port 149, the inner end of which has a greater axial dimension than the outer end thereof, and the inner end of which is constantly in registration with the stationary port 150, which enters the cylinder, and the outer end of which is in registration with the stationary inlet port 151 in the valve housing in one extreme position of the slide valve 118, and which is in registration with the stationary relief port 152 in the valve housing, in the other extreme position of the slide valve 118. The slide valve 118 of the "neutral" cylinder is controlled by a trigger arm 124, spring yoke 131, and springs 132 and 133, similar to the trigger arms which are associated with each of the slide valves 120 and 123 inclusive, of the gear-shifting cylinders 30, 31, 32 and 33. Thus, the normal or inoperative position of the "neutral" cylinder, and the normal position of the slide valve 118 is that shown in Figure 2, wherein the air inlet port 151 is in communication with the "neutral" cylinder. To the end 154 of the valve chamber containing the slide valve 118, a certain air line 153 is connected from the selector mechanism, through which an impulse of compressed air may be supplied momentarily, against the outer end of the slide-valve 118, thereby moving said slide valve in the direction of the arrow 155, towards its "relief" position;—said slide valve being carried through the latter portion of its travel by the force of the springs 132 and 133, acting through the trigger arm 124. In the "relief" position, the air is exhausted and the slipper cam 97 is returned under the influence of the springs 108 and 109.

*The automatic control*

The gear "shifting" and "clearing" cylinders, to wit, the "1st", "reverse", "second" and "high" cylinders, and the "neutral" cylinder, forming a part of my present invention, are each connected with two different air lines or air conduits.

One air conduit or air line or connection interconnects the main inlet port or cylinder-actuating port with a source of compressed air, such as an air compressor 160 and air reservoir 161, through which compressed air is supplied to the respective gear-shifting pistons, as well as to the "neutral" piston, that is, the piston which "clears" the gears, for the purpose of causing said pistons to move through one of their two strokes. By this compressed air, the gear-shifting pistons are moved through their respective operative, or gear-shifting strokes, while through this compressed air the "neutral" piston is moved through its inoperative stroke and maintained in its normal position against the force of the springs 108 and 109, which in turn tend to move said "neutral" piston and the associated slipper-cam 97 through their operative stroke.

Another set of air conduits or air lines interconnects another port of each of said cylinders ("1st", "reverse", "2nd", "high" and "neutral"), and the control housing or "selector" housing 170. This second set of air conduits or air lines is for the purpose of controlling the snap valves or slide valves of the respective cylinders and is connected to the ports in the valve housings of the respective cylinders, through which said snap valves or slide valves are actuated in one direction.

Figure 8:
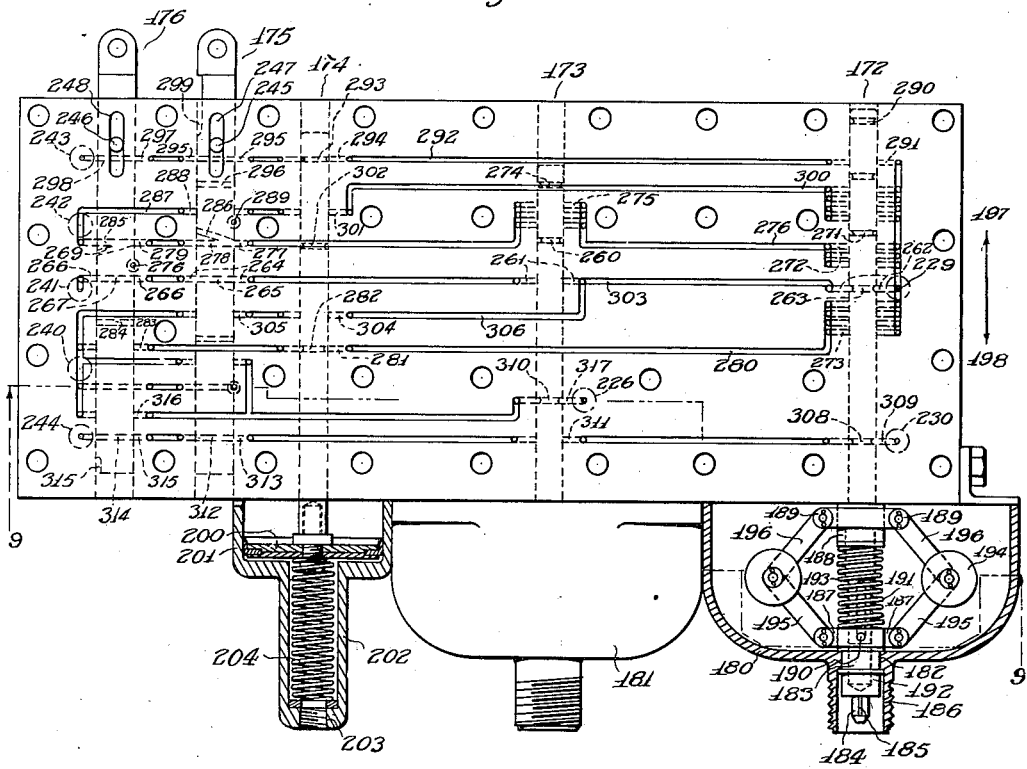
Figure 8 represents a top plan view of the selector mechanism or selector "box" with the upper cover plate removed therefrom, so as to expose to view the air passageways.
Figure 9:
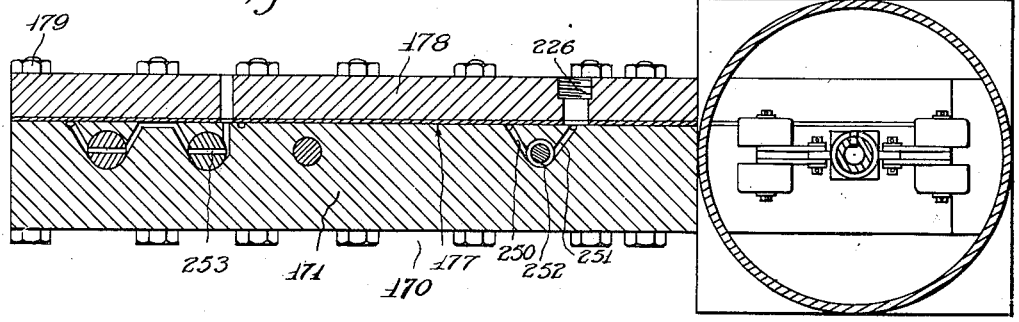
Figure 9 represents a section generally on line 9—9 of Figure 8.

In Figures 8 and 9 I have illustrated the selector means, to which the air-inlet ports governing the snap valve action of the various cylinders are connected, and whereby the cylinders are actuated, responsive to the various conditions of engine speed, automobile speed, and intake-manifold vacuum.

The selector means, designated generally by the numeral 170, includes a main valve housing 171, having a series of valve chambers, which may be generally cylindrical openings, as indicated in Figures 8 and 9, and within which suitable valve members 172, 173, 174, 175, and 176 are slidably mounted. The valve chambers are interconnected by passageways which will be described more in detail hereinafter. In the particular embodiment of my invention herein shown, the connecting air passageways within the valve housing 171, are formed by grooves provided in the outer surface 177 of the valve housing 171, and holes extending down from said grooves to the valve chambers. A cover member or cover plate 178, is then fastened down upon the grooved surface 177 of the valve housing 171, to form the outer wall of the grooves in the surface 177, which thereby form the air passageways. The cover plate 178 may be fastened by a suitable series of fastening means, such as the bolts 179 or the like. The connecting air lines are also connected to the cover plate 178, which is provided with suitable internally threaded openings or other suitable pipe-receiving sockets or means.

To the valve housing 171, two generally similar governor housings 180 and 181 are secured, in axial alignment with the valves 172 and 173, respectively. Within a suitable bearing portion 182 of each of the housings 180 and 181, a coupling member 183 is journalled or rotatably mounted and held against axial displacement by suitable collars or other means. The coupling member 183 is provided with a suitable shaft-receiving terminal 184, having a key 185, and adapted to receive the coupling socket of any suitable cable-type flexible shaft of any conventional construction;— the outer flexible conduit of which shaft is secured to the housing by a screw-threaded coupling collar or sleeve engaging the screw threads 186.

The coupling member 183 carries the opposed pivot members 187. To the valve element or member 172 (and the valve element 173 is similar in this respect) the collar 188 is secured, having a pair of similar pivot members 189. The outer end of the valve element or member 172 is slidably coupled to the coupling member 183, by means of a pin 190, which extends through the coupling member 183 and is secured therein, and which extends loosely through an elongated slot 191 in the free end of the valve member 172. The free slotted end of the valve member 172 fits loosely within a corresponding axial bore 192 in the coupling member 183. A helical compression spring 193 is operatively interposed between the axially immovable coupling member 183 and the axially movable collar 188 (which is affixed to the valve element 172). A pair of similar weights 194 are pivotally carried by pairs of links 195 and 196, which in turn are pivotally secured to the pivot members 187 and 189, respectively. Thus, the spring 193 tends to maintain the valve member 172 in its extreme position in the direction of the arrow 197, while the centrifugal force upon the weights 194, due to the rotation of the governor, tends to move the valve element 172 in the direction of the arrow 198. The flexible shaft (not shown in Figure 8) from the governor housing 180, is connected to the drive shaft or propeller shaft of the automobile, in any suitable mechanical ratio, to give the necessary centrifugal force required to move the valve element. In the present embodiment of my invention the governor controlled valve 172 is intended to turn at twice the speed of the propeller shaft or drive shaft of the automobile.

The governor 181, controlling the valve element 173, being similar to the governor 180 of the valve element 172, is connected, through a similar flexible shaft, to the crank-shaft of the engine, and in the particular embodiment of my invention, is intended to turn at engine speed.

The valve element 174 is in turn connected to a piston 200, disposed in a suitable cylinder 201, which terminates in a spring housing 202, and which is connected through a suitable opening 203 in a corresponding conduit or pipe line, to the intake manifold of the engine. A helical compression spring 204 is operatively interposed between the piston 200 and the terminal wall of the housing 202, thereby tending to move or urge the valve element 174 in the direction of the arrow 197. The suction or "vacuum" in the intake manifold of the engine exerts a force upon the piston 200 in the direction of the arrow 198, which is opposed by the spring 204. The position assumed by the valve 174 will therefore be the position of balance between the force of the spring 204 and the force of the vacuum in the intake manifold upon the piston 200.

The valve elements 175 and 176 are in turn connected to the gear-shifting slides or secondary slides 62 and 61 respectively, and have, principally, two opposed operative positions in the two opposite limits of their travel and move in unison with the respective gear-shift slides 10 and 11. (See Figure 1.)

Upon the dashboard or instrument panel 205, or at any other suitable place within the driver's reach, a "cut-out" valve 206 and a "reverse" valve 207 are provided, which in Figure 1 are illustrated merely diagrammatically. Thus, the stationary valve housings of these valves are identified by the numerals 208 and 209, respectively, while the movable valve elements are identified by the numerals 210 and 211, respectively.

Each movable valve element 210 and 211 is provided with any suitable manually operable handle or knob 212 and 213 respectively, by means of which each of said valves may be placed in either one of two operative positions, which may be defined by suitable stops or other means for limiting the movement of said valve element (such means not being shown in the drawings).

The valve housing 208 is provided with an inlet port 214, which is connected with the source of compressed air, such as the reservoir 161 or compressor 160 by means of a suitable conduit or piping 215. The valve housing 208 is also provided with another port 216, which is adapted to be connected through a movable port or passageway 217, with the inlet port 214, while the automatic gear shifting mechanism is in operation. To the port 216 of the housing 208, the air supply lines 218 and 219 are connected, through which compressed air is supplied both for the operation of the gear shifting and gear "clearing" or "neutral" pistons, as well as for the operation of the snap valves which directly control said piston.

The pipe line 218 extends to the inlet port 220 of the "reverse" valve 207. The line 219 is connected through the branch lines 221, 222, 223 and 224, to the inlet ports 137 of each of the gear-shifting cylinders 30, 31, 32, and 33, and to the inlet port 151 of the gear-"clearing" or "neutral" cylinder 34. Another branch line 225 supplies compressed air directly from the main shut-off valve 206 to the "neutral" inlet opening 226 in the cover plate 178 of the selector 170.

The valve element 211 of the "reverse" valve 207 is provided with a "forward" passageway 227 and a "reverse" passageway 228, through which the air may be valved to either one of two different inlet openings 229 and 230 in the cover plate 178 of the selector 170. The inlet port 220 of the valve housing 209 is provided with an elongated chamber 231, which is of sufficient length to communicate with the port 227 when the latter is in registration with the "forward" port 232, and also to communicate with the port 228 when the latter is in registration with the "reverse" port 233. The ports 232 and 233 are in turn connected to the corresponding inlets 229 and 230 of the selector 170 by means of any suitable conduits 234 and 235, respectively.

The "reverse" valve housing 209 is provided with a vent port 236, intermediate the "forward" and "reverse" ports 232 and 233, and the valve element 211 is provided with a by-pass 237, which interconnects the port 232 in one position of the valve, and the port 233 in the other position of the valve, with the vent port 236;— so that the port which is disconnected from the compressed air line 218, is connected to the vent or relief port 236. Thus, when the automatic gear-shifting mechanism is set for "forward" travel, by means of the setting of the valve element 211 on the dash board, the control air lines of the "reverse" cylinder are inoperative and also open to atmospheric pressure if connected to the line 235, by means of the valve elements 172, 173, 174, 175 and 176. Similarly, when the gear-shifting mechanism is set for "reverse" travel by the corresponding setting of the valve element 211 on the dash board or control panel, the direct control valves or snap valves of the three "forward" cylinders are connected or vented to the atmosphere and rendered inoperative, regardless of the setting of the valves 172, 173, 174, 175, and 176.

The shut-off valve 206, adapted to render inoperative the entire gear-shifting mechanism, is also provided with a vent or relief port 238, and the by-pass 239 in the valve element thereof, whereby the lines 218 and 219, leading to the selector 170, both directly as well as through the "reverse" valve 207, as well as the branch line 221 leading to the operating cylinders, that is, the gear-shifting and gear-clearing cylinders, are all connected to the atmosphere. Thus, when the shut-off valve or "cut-off" valve 206 is set into the "off" or inoperative position, the entire automatic gear-shifting mechanism is rendered inoperative, but the gears of the automobile are left under the full control of the manual gear-shifting device, that is, the gear-shifting lever, so that the gears may be shifted manually in the conventional manner.

The cover plate 178 of the selector 170 is also provided with outlet openings 240, 241, 242, 243, 244, through which the impulses of control air are supplied to the direct control snap valves of the "neutral" cylinder 34, the "1st", "2nd", and "high" cylinders 30, 32, and 33, and to the "reverse'" cylinder 31, respectively.

In the drawings, particularly in Figure 8, the valve element 172 is shown in the position assumed thereby when the governor of said valve element is stationary, that is, when the automobile and the propeller shaft or driving shaft or axle thereof is stationary.

The valve element 173, on the other hand, is shown in Fig. 8, in the position assumed thereby with the engine at "idling" speed, the initial compression of the governor spring being sufficient to prevent displacement of said valve element until "idling" speed is exceeded. The governor spring has initial compression enough to prevent displacement of the valve at speeds below "idling" speed. The valve position therefore is the same for "dead engine" and "idling" condition.

The valve element 174 on the other hand, is also shown in the position assumed thereby when the engine is "idling", that is, when the vacuum in the intake manifold of the engine is relatively high.

The valve elements 175 and 176 on the other hand, are shown in the "neutral" position of the gears. These valve elements 175 and 176 are provided with key pins 245 and 246, respectively, which extend into and fit loosely within elongated slots 247 and 248, respectively, in the body of the valve housing 171, thereby to maintain said valve elements 175 and 176 in predetermined and fixed angular relation to the cylindrical chambers in which said valve elements are slidably mounted.

The manual control valve elements 210 and 211, shown in Figure 1, are in turn shown in their "on" or operative position, and in the "forward" position, respectively.

In Figures 8 and 9 of the drawings, it will be observed that the air passageways or channels which are formed in the upper surface 177 of the valve block or housing 171, are connected, at certain points, to certain of the transverse cylindrical valve chambers in which the valve elements 172, 173, 174, 175, and 176 are slidably mounted. The connection of the channels with the valve chambers is indicated by the small solid circles at the end of the channels shown in solid lines and the parallel dotted lines leading from such small circles to the edge of the valve chambers (the latter also being shown in dotted lines in Figure 8). The holes indicated by the small circles and parallel dotted lines, are inclined holes extending from the surface channels to the valve chamber, as indicated particularly in the sectional view in Figure 9, which is taken on lines 9—9 of Figure 8.

The connection between any pair of juxtaposed or aligned, inclined passageways 250 and 251 (see Figure 9) is obtained by registration with certain annular grooves 252 in said valve elements 172, 173 and 174, and is obtained by registration with certain transverse rectilinear holes 253 extending through the valve elements 175 and 176. (The valve elements 172 and 173 rotate with the rotation of the respective governors, while the valve element 174 is free to turn, although it is not definitely rotated, and the valve elements 175 and 176 are fixed against rotation by the key pins and slots 245 to 248 inclusive, as shown in Figure 8.)

The compressed air in the reservoir 161 is maintained more or less constant by the compressor 160, which may be either constantly or intermittently connected to the engine, so that the operation of the engine for a suitable length of time will charge the reservoir 161 with compressed air at the suitable pressure. The pressure in the tank 161 may be maintained more or less constant, within a suitable range, either by an automatic pressure-controlled or pressure-responsive cut-out interposed between the engine of the automobile and the compressor 160, or by an automatic pressure-controlled relief valve connected with the reservoir 161, or by an automatic pressure-controlled or pressure-sensitive valve mechanism or governor, associated with the compressor, which may permit the compressor to be driven by the engine, without building up pressure, whenever the pressure within the reservoir 161 is sufficiently high.

As shown particularly in Figures 1, 8 and 9, when the cut-out valve 206 is set into the operative or "on" position, the compressed air is connected therethrough to the cylinder-operating ports of all the snap valves or direct-control valves of each of the "gear-shifting" cylinders 30, 31, 32, and 33, and of the "gear-clearing" or "neutral" cylinder 34. (See Figure 1.) Also directly through the valve 206 the air is connected through the line 225 to the neutral inlet opening 226 in the selector 170.

Through the manually operable valve 207, by means of which the mechanism may be set into either "forward" or "reverse", the compressed air is supplied either to the inlet opening 229 or the inlet opening 230 of the selector 170, depending upon the position of the valve element 211. In Figure 1 the valve element 211 is shown in the "forward" position, wherein the air is connected through the passageway 227 thereof, and through the line 234 to the "forward" inlet opening 229 of the selector 170.

*"Forward" operation of the automobile*

Until the snap valves or direct-control valves of the "gear-shifting" cylinders 30, 31, 32, and 33 have received an impulse of control air through the selector 170, said snap valves or direct-control valves are in their innermost or "relief" positions shown particularly in Figure 4. In this position the direct supply of compressed air from the line 221 is shut off from the respective gear-shifting pistons 42. This is the condition of the direct-control valves or snap valves of the gear-shifting cylinders with the engine "idling" and the automobile stationary.

The direct-control valve or snap valve 118 of the "gear-clearing" or "neutral" cylinder 34, is in the open or air-admitting position shown in Figure 2, while the engine is idling and the automobile is stationary, and this valve is set into its "relief" position through an impulse of control-air sent to it from the selector 170. As soon, therefore, as the pressure of the compressed air in the reservoir 161, acting upon the neutral piston 100, exceeds the force of the "gear-clearing" springs 108 and 109, the "neutral" piston 100 and the slipper cam 97 are moved into their normal position shown in Figure 2, and maintained there by the force of the compressed air, until such time as the compressed air is shut off and the "neutral" cylinder "vented" by an impulse of control-air (connected to the opening 153) acting upon the end of the snap valve 118 and displacing it into its shut-off and vent position. When the valve is so actuated, momentarily, the slipper cam 97 is drawn to its extreme position by the pull of the springs 108 and 109, thereby "clearing" all the gears, that is, shifting into "neutral" any gear which may be in a meshed position.

With the engine idling, and the automobile wheels stationary, and the gears in "neutral", the valves are as shown in Figure 8.

In this condition, the valves are so set, that there is no clear passageway from the inlet 229 of the selector 170 to either the "1st", "2nd" or "high" outlets 241, 242, or 243 of the selector 170. To start the automobile, the operator now actuates the conventional foot pedal, and thus accelerates the engine. When a suitable and pre-determined (rotational) engine speed has been reached, the governor 181 causes the valve 173 to be displaced until the annular groove 260 thereof registers with the inclined ports 261 in the valve housing or valve block 171. The movement of the valve element 173 under the influence of the governor 181, is limited to a position in which the annular groove 260 registers with the inclined ports 261 on the two sides of the valve element. At this particular engine speed, the control air supplied to the "forward" or "ahead" inlet opening 229, passes through the inclined ports 262, on the two sides of the valve element 172 (which is then in its "dead-wheel" position shown in Figure 8) and through the registering annular groove or port 263 in the valve element 172, and then through the stationary ports 264 on either side of the valve element 175, and through the registering movable port or passageway 265 extending through the valve element 175, and through the stationary ports 266 on either side of the valve element 176 and the registering movable port 267 in said valve element 176 and out through the outlet 241;—from whence it is delivered through the conduit 268 to the valve-control inlet port 136 of the snap-valve or direct-control valve of the "1st" cylinder 30. This impulse of control-air thus valved to the direct control valve of the "1st" cylinder by the selector 170, as a result of the acceleration of the engine, causes the outward displacement of the direct-control valve of the "1st" cylinder until the trigger and spring mechanism thereof places it into its extreme outward position where the movable port 144 thereof interconnects the stationary ports 137 and 50, and thus admits compressed air from the direct lines 221 to the "gear-shifting" piston 42 of the "1st" cylinder. This actuates the piston and causes a displacement of the arm carried by the "1st" and "reverse" shaft, thereby causing the operation of the corresponding rack slide and the corresponding secondary or gear shifting slide, and simultaneously (though slightly in advance of the actual meshing of the gears) causing the closing of the gas throttle to the idling position, and the disengagement of the clutch of the engine (through the action of the plunger 69, the clutch actuating connection 81, and the throttle connection 259).

The shifting of the "1st" gear into the meshing position, at once cuts off the control air to the direct-control valve or snap valve of the "1st" cylinder, by reason of the shifting of the valve element 176 in the direction of the arrow 198. As the valve element 176 is moved into its extreme position in the direction of the arrow 198, the inclined movable port 269 in said valve element 176 connects the outlet 241 with a vent opening 276 in the valve housing cover plate 178, thereby relieving the control-air from the snap valve or direct-control valve of the "1st" cylinder. As the gear shifting piston 42 of the "1st" cylinder 30 reaches the limit of its travel under the influence of the direct supply of compressed air, it engages the pin or other suitable connection 141 carried by its snap valve and causes said snap valve to be tripped into its inner or shut-off position shown in Figure 4 of the drawings. In this position, the direct supply of compressed air is shut off, and the vent or relief openings 150 and 146 are opened, thereby permitting the return movement of the gear shifting piston 42 under the influence of the spring 47, and also under the influence of the spring 79 and the spring of the clutch of the automobile acting through the cam shown in Figure 6. This permits a re-engagement of the clutch of the automobile and a re-opening of the gas throttle of the engine under the influence of the foot action or manual action of the operator (pressing on the foot gas pedal or acting upon a manual gas control). As stated hereinabove, the relief openings of the "1st" and "reverse" cylinders are arranged as shown on the left side of Figure 4, thereby to moderate the re-engagement of the clutch in the two "dead-wheel" conditions of the automobile. Also as stated hereinabove, the size of the final relief opening 148 of the "1st" and "reverse" cylinders, may be varied according to the clutch action desired in these two gear positions, and may also be further controlled according to the inclination of the automobile, that is, according to the grade of the road-bed or surface upon which the automobile may be resting at the time, by superimposing a pendulum-controlled valve upon the final relief of the direct operating air which otherwise vents through the opening 148. This pendulum-controlled valve may be so arranged that the opening and closing of the valve or the particular setting of the final relief valve is governed by the position assumed by the pendulum, and this, in turn, is controlled by the longitudinal position of the automobile with respect to the horizontal. By this means, the clutch actions in "1st" and in "reverse" may be further moderated or softened if the automobile is so located that it must be started from "dead-wheel" condition against an up-grade, and so that, on the other hand, the clutch action in these two positions will be quickened if the automobile is started on a down-grade.

As the automobile accelerates in "1st" under the influence of the foot-action or manual action of the operator, (pressing his foot on the gas pedal or acting upon a manual gas control), the valve element 172 responsive to the drive shaft or wheels of the automobile, moves in the direction of the arrow 198 (Figure 8) until the annular groove 271 of the valve element 172 registers with the stationary ports 272 and until the annular groove 263 registers with the stationary ports 273;—the registration of the former annular groove (271) being preferably slightly in advance of the registration of the latter annular groove (263).

This registration of the annular groove 271 with the stationary ports 272 and the registration of the annular groove 263 with the stationary ports 273, takes place at a wheel speed or drive shaft speed, which necessitates an engine speed in "1st" which will cause the governor 181 connected to the engine, to bring the annular groove 274 of the valve element 173 into registration with the stationary ports 275. This connects control air through the "2nd" line 276 and through the stationary ports 277 and movable port 278, to the stationary port 279, where it is stopped by the valve element 176 in the "1st" position. The control air, however, is also connected straight through the line 280 and stationary ports 281, and the registering annular groove 282 in the valve element 174 (the valve element 174 being sufficiently displaced by the high vacuum), to the neutral outlet opening 240, through the stationary ports 283 and the movable port 284 registering therewith in the "1st" position of the valve element 176;—thereby causing the operation of the direct control valve or snap valve of the "neutral" cylinder, and releasing the direct air pressure from the "neutral" piston and permitting the slipper cam 97 to clear the "gears", that is, to shift the "1st" gear into its "neutral" position. This, in turn, shifts the valve element 176 into its "neutral" position, thereby breaking the "neutral" control line through the channel 280 and extending the control air through the movable port 285 to the "2nd" outlet 242 of the selector 170. This causes the operation of the snap valve of the "2nd" cylinder, and causes said cylinder to shift the "2nd" gear in the direction of the arrow 198, and also to shift the valve element 175 in the direction of the arrow 197. This, in turn, disconnects the control air and vents the snap valve of the "2nd" cylinder through the inclined port 286 and the channel 287 and the stationary port 288, through the vent opening 289 in the cover plate 178 of the selector 170. The automobile then continues to accelerate in "2nd" until a predetermined wheel speed is attained, when the annular groove 290 registers with the stationary ports 291, through which a control-air connection is established through the "3rd" line 292 and the annular channel 293 and stationary ports 294, and through the stationary ports 295 and the movable port 296 in registration therewith, and through the stationary ports 297 and the movable port 298, to the "3rd" outlet 243 of the selector 170. By this means, an impulse of control-air is supplied to the snap-valve of the "3rd" cylinder, thereby causing said cylinder to shift the "2nd" and "high" slides out of the "2nd" position, through "neutral" and into the "high" position, and causing the valve element 175 to be shifted in the direction of the arrow 198. This disconnects the control air, and automatically vents the snap-valve of the "high" cylinder through the cut-out or recess 299 in the valve element 175.

The automobile may then continue to accelerate in "high" without any change in gears until the load on the engine is increased and the speed of the car decreased, as for instance, by too steep an up-grade, when the valve element 174 is moved in the direction 197, due to the loss of vacuum, and an impulse of control air is sent through the groove or line 300, and the stationary ports 301 and the movable or annular groove 302, and the stationary ports 288 and movable port 296, thereby causing an impulse of control-air to be sent to the snap-valve of the "2nd" cylinder, thereby shifting the gears first into "neutral" and then into "2nd". A further reduction in the speed of the automobile and a further load on the engine and the consequent loss of vacuum will, in turn, send an impulse of control-air through the line 303 and the stationary ports 304 and the movable port or annular channel 282, the stationary ports 305 and movable port 268, to the "neutral" outlet 240, thereby to permit the operation of the "neutral" cylinder. Immediately thereafter, an impulse of control air is again sent through the "1st" outlet 241 in the same manner as in starting from a dead stop. By this means, the "gears" may be shifted "down" not only from "high" to "2nd" but also from "2nd" to "1st" if the car speed decreases and engine load increases still further. The valve element 172 is so limited in its movement and is so adjusted with respect to the automobile speed, that at a certain threshold value of automobile speed, no "shifting-down" will take place, either from "high" to "2nd", or from "2nd" to "1st", but only below these threshold speeds can the "shifting-down" take place.

To operate the automobile in "reverse", the valve element 211 is moved into its outer position by pulling the handle 213 on the dashboard or control panel of the automobile, to its outer position. By this means, all the "forward" control lines are vented through the port 236 and the control air through the line 218 is sent through the movable port 228 and the line 235 into the "reverse" inlet 230 of the selector 170. The "reverse" operation will take place when the automobile is stationary or the wheels are "dead", when the movable annular groove or port 308 registers with the stationary ports 309, and the movable annular groove or port 310 registers with the stationary ports 311, by reason of the acceleration of the engine for starting the car in "reverse". The gear-shift-operated valve elements 175 and 176 being in their respective "neutral" positions, the movable port 312 is in registration with the stationary ports 313, and the movable port 314 is in registration with the stationary ports 315. This establishes a control air connection to the "reverse" outlet 244 of the selector 170 and sends an impulse of control air to the snap valve or direct control valve of the "reverse" cylinder, thereby causing the piston thereof to operate the gear shift into "reverse", and to displace the valve element 176 in the direction of the arrow 197. The automobile is thus caused to travel in the "reverse" direction under the control of the operator through the gas pedal. Through the recess 315 in the valve element 176, the snap valve of the "reverse" cylinder is vented. The gears will remain in "reverse" until the engine speed is reduced when the movable annular port 310 registers with the stationary ports 317 and the movable port 314 registers with the stationary ports 316, and sends an impulse of control air from the "neutral" inlet 226 to the "neutral" outlet 240 of the selector 170, thereby causing the operation of the "neutral" slipper cam 97, and thereby disengaging the gears.

Similarly, if the engine is slowed down by the slowing down of the automobile, while either the "1st", "2nd" or "high", or "reverse" gears are engaged; until port 310 registers with stationary ports 317, such registration will open a passage to the neutral outlet 244 through one of the sets of movable and stationary ports provided. By this means the "neutral" is operated and the stalling of the engine is thus made impossible under any condition of driving.

Whenever the gears have been shifted into "neutral" the neutral snap valve line will be vented through the ports in valves 176 and 175 and the vent hole in the cover 178, as shown clearly in Figure 8, and also in the left portion of Figure 9. This venting of the neutral snap valve line allows said snap valve to be returned to the operative position shown in Figure 2.

The vacuum-controlled valve 174 also provides a regulatory action, in that it prevents shifts from "high" into "2nd" gear and from "2nd" into "1st" gear, except when the manifold vacuum is low; that is, when the engine is heavily loaded. Thus, when slowing down the car in "high" or "2nd" gear, as for stopping, there is no shifting whatever until the engine has been slowed down sufficiently to bring the neutral shift cylinder into action;—this being the only shift, because the engine is not sufficiently loaded and the intake manifold vacuum has therefore not dropped sufficiently to permit a "shifting down" from "high" to "2nd" or from "2nd" to "1st."

If, after having slowed down however, instead of stopping the driver opens the throttle wide, the gear, will immediately "shift down", owing to the change in manifold vacuum, thus providing for the rapid acceleration desired. If on the other hand the throttle is opened only slightly, so as not to drop the manifold vacuum to the operative point, no shift will take place and the car will accelerate more slowly with the original gear setting.

A still further degree of flexibility is obtained by so proportioning the ports and travel of the valve 172, that port 271 overtravels stationary ports 272 just before port 290 registers with ports 291. Thus, if a start is made, downhill for example, with the car moving before the throttle is opened, the gear may be shifted initially into "2nd" or "high" instead of into "1st", depending on which set of ports is in registration, and depending on how fast the automobile is moving when the throttle is opened.

Thus, it is possible also to skip a gear position in accelerating the car, or to retain the "low" or "1st" gear setting, at relatively high car speeds, by maintaining the throttle sufficiently open to keep the manifold vacuum low. Valve element 174 then cuts off connection from all the snap valves until the throttle is again partially closed. If, when accelerating in "1st" under these conditions, the speed of the automobile is increased until ports 290 and 291 register, instead of ports 271 and 272, the shift, when accomplished by a partial closing of the throttle, will be from "1st" into "high", instead of from "1st" into "2nd".

It will thus be seen that the entire control of the transmission, including a very valuable measure of voluntary control in addition to the fully automatic control, is achieved by the manipulation of the throttle only.

I am aware that my invention may be embodied in other specific forms without departing from the spirit or essential attributes thereof, and I therefore desire the present embodiments to be considered in all respects as illustrative and not restrictive, reference being had to the appended claims rather than to the foregoing description to indicate the scope of the invention.

Having thus described my invention, what I hereby claim as new and desire to secure by Letters Patent, is:

1. In combination with an automobile having a prime mover and a speed change device operatively interposed between said prime mover and the driving wheels of said automobile and having a neutral position, including several sets of gears, some capable of being moved into and out of meshing relation with others, of a set of pneumatically operated gear setting devices corresponding to said movable gears, a source of pneumatic power for operating said gear-setting devices, and valved control means superimposed upon said source of power including means responsive to the speed of the automobile and the condition of loading of the prime mover for shifting from one set of gears to another, and means responsive to the engine speed for shifting the gears to neutral.

2. In combination with an automobile having a prime mover, driving wheels, and means intermediate said prime mover and said driving wheels and operatively related to both, capable of varying the mechanical ratio between the prime mover and the driving wheels, of pneumatically actuated means for effecting changes in said mechanical ratio;—said pneumatically actuated means being responsive to the speed of the automobile and to the speed of the prime mover.

3. In combination with an automobile having a prime mover, driving wheels, and means operatively interposed between said prime mover and said driving wheels for varying the mechanical ratio between the two, and pneumatically operated means for effecting a variation in said mechanical ratio, said pneumatically operated means being responsive to the speed of the automobile, the speed of the prime mover, and the torque condition of the prime mover.

4. In combination with an automobile having a prime mover, driving wheels, and means operatively interposed between the prime mover and the driving wheels capable of varying the mechanical ratio between the two, and means, intermediate said prime mover and said means capable of varying the mechanical ratio, adapted to disengage the prime mover, and pneumatic means responsive to engine loading conditions for effecting said variation in mechanical ratio and for causing the disconnection of said prime mover in timed relation to said variations.

5. In combination with an automobile having a prime mover and driving wheels, of a speed change device operatively interposed between said prime mover and said driving wheels, including several sets of gears of different mechanical ratio, capable of being selectively rendered operative and inoperative, a set of pneumatically operated gear-setting devices corresponding to said several sets of gears, adapted to render the same operative, a pneumatically operated gear-clearing device common to each of the several sets of gears, adapted to render the same inoperative, and selector valves responsive to the loading of the prime mover, for controlling said gear setting and clearing devices.

6. In combination with an automobile having a prime mover and driving wheels, of a speed change device operatively interposed between said prime mover and said driving wheels, including several sets of gears of different mechanical ratio, capable of being selectively rendered operative and inoperative, a set of pneumatically operated gear-setting devices corresponding to said several sets of gears, adapted to render the same operative, a pneumatically operated gear-clearing device common to each of the several sets of gears, adapted to render the same inoperative, a valve associated with each of said pneumatically operated gear-setting devices and with said pneumatically operated gear-clearing device, for controlling the actuating air-supply leading to each of said devices, and pneumatic means for selectively operating said actuating valves.

7. In combination with an automobile having a prime mover and driving wheels adapted to be propelled thereby, and a speed change device operatively interposed between said prime mover and the driving wheels of said automobile, including several sets of gears of different mechanical ratio, capable of being alternatively rendered operative, pneumatic means capable of rendering operative any one of said sets of gears, pneumatic means capable of rendering each of said sets of gears inoperative, a source of compressed air for said pneumatic means, a pneumatically operated actuating valve for controlling the compressed air to each of said pneumatic means, and a plurality of selector valves operatively interposed between the source of compressed air and said actuating valves for selectively operating said actuating valves in predetermined relation to the operating conditions of the automobile.

8. In combination with an automobile having a prime mover and driving wheels adapted to be propelled thereby, a speed change device operatively interposed between said prime mover and said driving wheels, pneumatic means for operating said speed change device, a pneumatic selector device for controlling said pneumatic speed-change-operating means; said selector device including a plurality of interrelated valves, at least one of which is operated in fixed relation to, and as a result of, the operation of the speed change device, at least one of which is operated responsive to the speed of the automobile, and at least one of which is responsive to the torque condition of the prime mover.

9. In combination with an automobile having a prime mover and driving wheels adapted to be propelled thereby, a speed change device operatively interposed between said prime mover and said driving wheels, pneumatic means for operating said speed change device, a pneumatic selector device for controlling said pneumatic speed-change-operating means; said selector device including a plurality of interrelated valves, at least one of which is operated in fixed relation to, and as a result of, the operation of the speed change device, and at least one of which is operated responsive to the speed of the prime mover.

10. In combination with an automobile having a prime mover and driving wheels adapted to be propelled thereby, a speed change device operatively interposed between said prime mover and said driving wheels, pneumatic means for operating said speed change device, a pneumatic selector device for controlling said pneumatic speed-change-operating means; said selector device including a plurality of interrelated valves, at least one of which is operated in fixed relation to, and as a result of, the operation of the speed change device, and at least one of which is operated responsive to the loading condition of the prime mover.

11. In combination with an automobile having a prime mover, driving wheels adapted to be propelled thereby, a clutch and speed change gears operatively interposed between said prime mover and said driving wheels, the latter being adapted to vary the mechanical ratio between the prime mover and the driving wheels, of a gear actuating device including a plurality of pneumatic cylinders and pistons therein for rendering said gears operative in any one of several gear ratios, and for rendering the same inoperative, and means actuated by each of said pistons for disengaging the clutch during the initial portion of the operative stroke thereof.

12. In combination with an automobile having a prime mover, driving wheels adapted to be propelled thereby, a clutch and speed change gears operatively interposed between said prime mover and said driving wheels, the latter being adapted to vary the mechanical ratio between the prime mover and the driving wheels, of a gear actuating device including a plurality of pneumatic cylinders and pistons therein for rendering said gears operative in any one of several gear ratios, and for rendering the same inoperative, and selector valves responsive to the loading of the prime mover, for controlling said gear actuating device.

13. In combination with an automobile having a prime mover, driving wheels adapted to be propelled thereby, a clutch and speed change gears operatively interposed between said prime mover and said driving wheels, the latter being adapted to vary the mechanical ratio between the prime mover and the driving wheels, of a gear actuating device including a plurality of pneumatic cylinders and pistons therein for rendering said gears operative in any one of several gear ratios, and for rendering the same inoperative, and means actuated by each of said pistons for reducing the speed of the prime mover to idling, and for disengaging the clutch.

14. In combination with an automobile having a prime mover, driving wheels adapted to be propelled thereby, and a speed change device operatively interposed between said prime mover and said driving wheels for varying the mechanical ratio between the two, of power-actuated means for selectively operating said speed change device, and a pneumatic selector device pneumatically connected with said power-actuating means and adapted to control the same responsive to the operating conditions of the automobile;—said pneumatic selector device including a plurality of inter-related valves, some having, and some being capable of being set into, predetermined operative positions corresponding to each of the several positions of the speed change device, and some being set automatically responsive to the speed of the automobile and the power-loading of the prime mover.

15. In combination with an automobile having a prime mover, driving wheels adapted to be propelled thereby, a speed change device operatively interposed between said prime mover and said driving wheels and adapted to be set into a plurality of positions to vary the mechanical ratio between the prime mover and the driving wheels, of a power-actuated speed change operating device adapted automatically to set said speed change devices into any one of its several positions, and including a pneumatic selector having a plurality of inter-related movable valve elements, some being movable in predetermined and fixed relation to the settings of said speed change device, one being moved generally responsive to the speed of the automobile, and one being moved generally responsive to the speed of the prime mover.

16. In combination with an automobile having an internal combustion engine, driving wheels adapted to be propelled thereby, a clutch and speed change gears operatively interposed between said internal combustion engine and said driving wheels, the latter being adapted to vary the mechanical ratio between the internal combustion engine and the driving wheels, of a gear actuating device including a plurality of pneumatic cylinders and pistons therein, means operatively interposed between said pistons and said speed change gears, for enabling said pistons to render said gears operative in any one of several positions of different gear ratios, and to render said gears inoperative, means actuated by said pistons for causing a disengagement of the clutch in timed relation to the setting of the gears, and means actuated by said pistons for causing the internal combustion engine to be automatically throttled down in timed relation to the operation of the clutch.

17. In combination with an automobile having an internal combustion engine, driving wheels adapted to be propelled thereby, a clutch and speed change gears operatively interposed between said internal combustion engine and said driving wheels, the latter being adapted to vary the mechanical ratio between the internal combustion engine and the driving wheels, of a gear actuating device including a plurality of pneumatic cylinders and pistons therein, means operatively interposed between said pistons and said speed change gears, for enabling said pistons to render said gears operative in any one of several positions of different gear ratios, and to render said gears inoperative, means actuated by said pistons for causing a disengagement of the clutch in timed relation to the setting of the gears, means actuated by said pistons for causing the internal combustion engine to be automatically throttled down in timed relation to the operation of the clutch, pneumatically actuated valves associated with said cylinders and pistons, for regulating the ingress and egress of air into the former, and selector valves operatively connected with said first-mentioned pneumatically operated valves for controlling the movements of the same; said selector valves being set responsive to the settings of said speed change gears and responsive to the speed of the automobile and the load conditions of the internal combustion engine.

HAVILAND H. PLATT.